United States Patent
Stobbe et al.

[11] Patent Number: 6,044,333
[45] Date of Patent: Mar. 28, 2000

[54] PROCESS AND DEVICE TO TRANSMIT DATA BETWEEN A READ/WRITE DEVICE AND A TRANSPONDER

[75] Inventors: Anatoli Stobbe, Steinradweg 3, D-30890 Barsinghausen; Hartmut Scheffler, Bad Nenndorf, both of Germany

[73] Assignee: Anatoli Stobbe, Barsinghausen, Germany

[21] Appl. No.: 09/170,569

[22] Filed: Oct. 13, 1998

[30] Foreign Application Priority Data

Oct. 10, 1997 [DE] Germany ............................ 197 44 781

[51] Int. Cl.⁷ .................................................. G08B 29/00

[52] U.S. Cl. ......................... 702/106; 342/100; 342/174; 331/41; 331/44

[58] Field of Search ............................. 702/106, 81, 182; 340/825.54, 825.34, 825.31; 342/44, 100, 174, 98; 331/40–44

[56] References Cited

U.S. PATENT DOCUMENTS

| | | | |
|---|---|---|---|
| 3,944,928 | 3/1976 | Augenblick et al. | 342/195 |
| 4,196,418 | 4/1980 | Kip et al. | 342/44 |
| 4,206,421 | 6/1980 | Bernhard et al. | 331/42 |
| 4,398,195 | 8/1983 | Dano | 342/64 |
| 5,105,190 | 4/1992 | Kip et al. | 340/825.34 |
| 5,124,699 | 6/1992 | Tervoert et al. | 340/825.54 |
| 5,491,471 | 2/1996 | Stobbe | 340/825 |
| 5,751,570 | 5/1998 | Stobbe et al. | 342/44 |
| 5,889,491 | 3/1999 | Minter | 342/174 |

*Primary Examiner*—Marc S. Hoff
*Assistant Examiner*—Bryan Bui
*Attorney, Agent, or Firm*—Collard & Roe, P.C.

[57] ABSTRACT

The invention relates to a device and process for data transmission. The data is transmitted by changes in the field strength of an electromagnetic or magnetic field, and then the times between at least two sequential field strength changes are evaluated. A frequency serving as the time base for evaluating the times between the field strength changes is calibrated at least at the beginning of data transmission so that it has a set relationship to the cycle duration of the field strength changes.

13 Claims, 1 Drawing Sheet

PROCESS AND DEVICE TO TRANSMIT DATA BETWEEN A READ/WRITE DEVICE AND A TRANSPONDER

BACKGROUND OF THE INVENTION

1. Field of the Invention

The present invention relates to a process to transmit data between a read/write device and a transponder. Systems consisting of read/write devices and transponders are used for the contactless identification of objects, persons and animals. The transponder is a data memory whose information can be read out and changed remotely with the read/write device. The information can be transmitted magnetically or electromagnetically. The data is transmitted from the read/write device to the transponder by changing the field strength of a high-frequency carrier and evaluating the time between sequential field strength changes.

2. The Prior Art

In the development of transponder systems, great value is placed on using as little energy as possible and integrating as many components as possible in a single chip. The first requirement for active transponder systems, having their own energy supply is to achieve the longest possible battery life. Passive transponder systems receive their energy from the magnetic or electromagnetic field of the read/write device. In these systems, the goal is to attain the longest possible range. This second requirement is also important due to the size of the transponder and the manufacturing costs.

According to the state of the art, a RC oscillator can be integrated on a single silicon chip with all of its frequency-determining components. Due to the limitations of the manufacturing process and the typical operating temperature and voltage range, this RC oscillator has a frequency tolerance of up to +/−30% in reference to its nominal value dimensioned in the chip design.

Unfortunately, when the time base for evaluating the coded-information is based on the frequency of such an oscillator, the possible data transmission speed is limited. To clearly differentiate between the different times between the field strength changes of the carrier, the time differences must be at least bigger than the possible tolerance of the oscillator. This requirement correspondingly means that there are slow data rates to prevent the tolerances of the oscillator from distorting the decoding.

To calibrate the oscillator, the oscillator can be trimmed with a laser beam after chip production or adjusted with memory cells. This process is involved and also has the disadvantage that frequency tolerances cannot be compensated by temperature and voltage changes.

SUMMARY OF THE INVENTION

The invention provides an improved process to transmit data between a read/write device and a transponder. In addition, another invention is based upon improving a device to implement the process to increase the precision of a frequency serving as a time base for evaluating the times between the field strength changes. Improving the device thus, allows for a faster data rate is achieved.

The process of the present invention achieves the proper relationship between the cycle duration and the time base by calibration. By counting the pulses of the time base, the field strength changes can be precisely evaluated. Different times between the field strength changes in which the information is coded can also be clearly differentiated from each other when these differences are the same or smaller than the initial tolerances of the frequency base.

The field strength changes are formed by both switching off and on a field, and partially lowering or raising the field strength of a field. The invention works well when fields are turned on or off since, in the pauses, i.e., when the field is turned off, there is no possibility for synchronization with the HF carrier of the read/write device. Therefore a precise time base is required in the transponder.

The ratio of the long and short pulses can be reduced (the pulses are defined by the times between the field strength changes) by shortening the long pulses and thereby reducing the cycle duration of the data signals and increasing the date rate.

The calibration at the beginning of data transmission automatically covers all frequency-determining influences that are important for current operation without their precise causes being relevant. Optimum transmission conditions are therefore created in the beginning. This is particularly important for dynamic systems in which the transponder is only briefly in the field of the read/write device and hence is only available for a brief transmission period. It is therefore better to transmit a signal with predefined times between the field strength changes because the initial calibration is predefined.

The elements forming the time base can be initially calibrated using intervals of known lengths that are stored as a numerical value in the transponder. After, the elements forming the time base are initially calibrated, the time base is then synchronized with the time base in the read/write device. After that, and it has the correct value for precisely evaluating the signals in the subsequent data transmission.

The calibration signals can be specified by their arrangement over time in the signal telegram or deviate from the data signals by their coding. The calibration signal can be a pulse limited signal formed by two sequential field strength changes whose length is greater than the cycle duration of the subsequent data signals.

In one embodiment of the invention, a systematic time deviation can be detected at least at the start of data transmission. Consequently, a correction value can be derived from it and used to calibrate the internal time base. The time deviation is from a set point that arises from an imprecision in the internal time base used for evaluation.

The calibration signal contains the information of a desired frequency. The actual frequency of the time base can be compared with the desired frequency and corrected to match the desired frequency. Since the actual frequency can be detected digitally and the desired frequency is known, the deviation can be determined immediately, and the necessary correction can be specifically carried out in one step. This produces sufficient precision for correct decoding during data transmission.

In addition, the average cycle duration of data signals detected over several periods can be used for subsequent or dynamic calibration. In one embodiment of the invention, the deviation from the setpoint can be detected during data transmission, and the correction value obtained at the beginning can also be corrected.

The time base is also corrected even when there are dynamic influences that can arise in passive transponders supplied with energy from the field of the read/write device. This is the case when the distance between the transponder and the read/write device changes during data transmission and the supply voltage subsequently fluctuates. A voltage change can also occur in active transponders when the battery fails. Even thermal influences can be compensated that arise when transponders are placed manually in the field of the read-write device and are heated by body heat can be compensated.

In one development, the frequency can be generated by a freely running oscillator. In this case, one or more of the frequency-determining components can be changed to calibrate it. In addition or alternately, the ratio of a down-stream voltage divider can be changed.

From the vantage point of circuitry, the first alternative appears easier, but it requires that the steps by which the frequency changes upon variations in the frequency-determining components is itself calibrated. Otherwise, the time base could not be specifically calibrated in one step.

The second alternative is purely digital and allows the specific calibration of the time base. Since only digital circuits are necessary that can be easily integrated on a chip, the additional effort required is usually inconsequential in practice.

The combined use of the two cited measures is possible to attain a greater variation range than is permitted by each of the measures by themselves. One object of the present invention is to provide an improved process for transmitting a signal between a read/write device and a transponder.

Another object of the invention is to provide an improved process to increase the precision of a frequency serving as a time base for evaluating the times between the field strength changes.

Still another object of the invention is to provide a device that allows for a faster data transfer rate from the read/write device to the transponder and back.

BRIEF DESCRIPTION OF THE DRAWINGS

Other objects and features of the present invention will become apparent from the following detailed description considered in connection with the accompanying drawings which discloses one embodiment of the present invention. It should be understood, however, that the drawings are designed for the purpose of illustration only and not as a definition of the limits of the invention.

In the drawing, wherein similar reference characters denote similar elements throughout the several views.

DETAILED DESCRIPTION OF PREFERRED EMBODIMENTS

Figure 1:
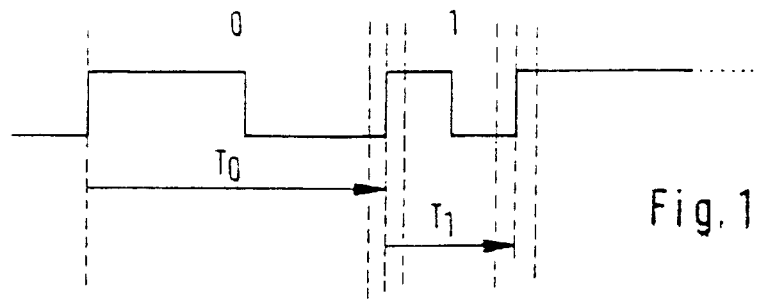
FIG. 1 shows a time chart representing different logical states and time tolerances of a data signal.

Turning now in detail to the drawings, FIG. 1 shows a time chart representing different logical states and time tolerances of a data signal. The different logical states correspond to an on or off HF carrier. A bit with the value "0" is defined by a longer cycle duration of a change of the logical states, and a bit with the value "1" is defined by a shorter cycle duration of a change of the logical states.

A normal way to digitally decode data is to count the pulses from an oscillator that are generated in the respective periods for the bits "0" and "1". The meter reading is evaluated after a period of the data signal expires.

By varying the oscillator frequency, different counter states result for the same cycle duration. When there are large deviations from the standard value, the cycle duration is decoded incorrectly.

If the cycle duration selected for $T_0$ and $T_1$ and their ratio is very large, the inaccuracies of the reference oscillator can be picked up. The disadvantage is a slow data rate. With a shorter cycle duration and lower ratio of $T_0/T_1$, the data rate can be higher. When the oscillator frequency is not precise, the cycle durations $T_0$ and $T_1$ can not be differentiated and the data signal is improperly decoded.

Figure 2:
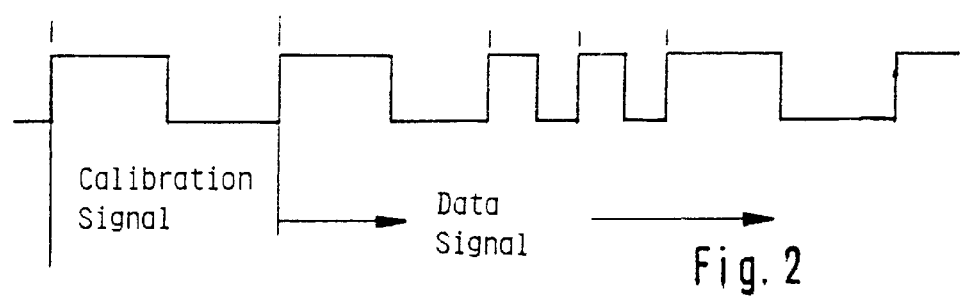
FIG. 2 shows a time chart representing the logical states of a leading calibration signal and following data signal.

FIG. 2 shows a time diagram representing the logical states of a leading calibration signal and following data signals as used in the invention to calibrate the time base.

At least the first transmitted data record is expanded by a calibration signal. The calibration signal is at least as long as an expected period of the data signal. In the decoder, there is a set programmed counter reading that serves as the setpoint for evaluating the calibration signal. A correction value is next calculated from the difference between the stored setpoint and the actual counter reading in the decoder.

Figure 3:
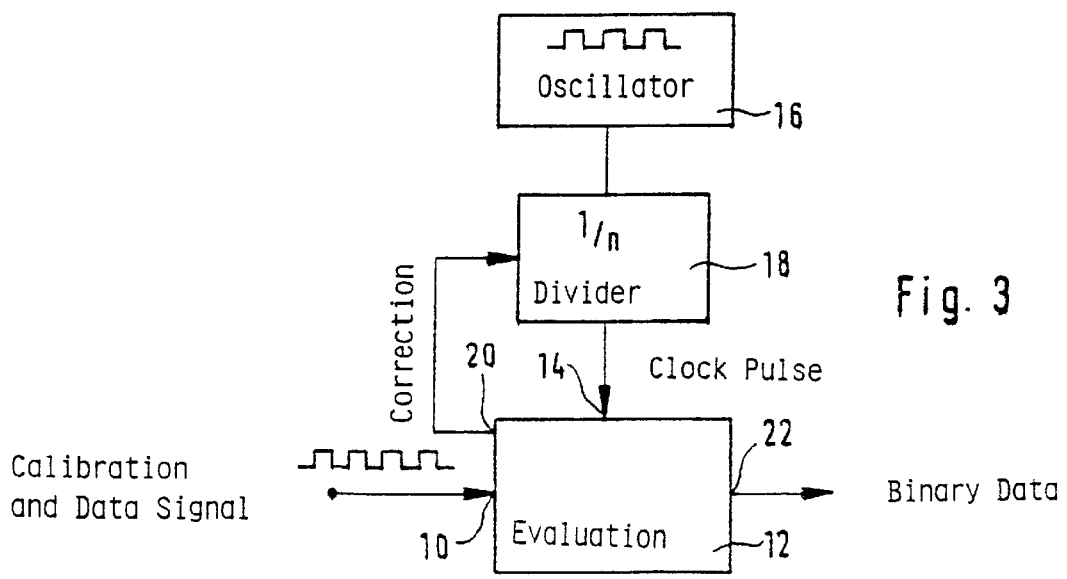
FIG. 3 shows a simplified block diagram of a decoder of a transponder.

FIG. 3 shows a simplified block diagram of a decoder in the transponder. An input 10 of an evaluation circuit 12 is fed a signal consisting of a leading calibration signal and following data signals as represented in FIG. 2. In addition, evaluation circuit 12 is fed a clock pulse via clock input 14 that is obtained with an RC oscillator 16 and subsequent programmable divider 18.

Programmable divider 18 is first adjusted to an initial value. After the calibration signal is recognized and evaluated, programmable divider 18 is adjusted based on the detected correction value via a control signal at a control output 20 of the evaluation circuit 12. In this way, the frequency of the RC oscillator 16 remains unchanged, and the clock pulse fed to the evaluation circuit 12 corresponds exactly to the intended frequency.

The data following the calibration signal is next evaluated correctly and appear as binary data at data output 22 of evaluation circuit 12. With this process, not only can the inaccuracies of the RC oscillator 16 be compensated, but the data rates themselves can be varied. The top limit is set by the oscillator frequency minus a tolerance of ca 30%. In addition, the minimum data rate is limited by the positive tolerance of ca +30% and the maximum possible divider factor of programmable divider 18.

During data transmission, evaluation circuit 12 can also detect the current correction value from the average duration of several cycle durations of the data signal, and the divider ratio of the programmable divider 18 can be adjusted as needed.

Accordingly, while only a single embodiment of the present invention has been shown and described, it is to be understood that many changes and modifications may be made thereunto without departing from the spirit and scope of the invention as defined in the appended claims.

What is claimed is:

1. A process for transmitting data between a printing and reading device and a transponder comprising the steps of:

a) transmitting a data signal from a read/write device to a transponder via an electromagnetic or magnetic field;

b) changing the field strength of the electromagnetic or magnetic field during the data transmission while maintaining substantially the same frequency; and c) calibrating a frequency for the field at the beginning of the data transmission by transmitting a signal between said printing and reading device and said transponder wherein the signal has predetermined time intervals.

2. The process according to claim 1, wherein before the step of transmitting the data signal, the process further comprises the step of:

transmitting a signal for initial calibration whose intervals between the field strength changes are predefined.

3. The process according to claim 2, wherein the calibration signals deviate from the data signals.

4. The process according to claim 3, wherein the signal transmitted for the initial calibration is a pulse limited by two sequential field strength changes whose length is greater than the cycle duration of the subsequent data signals.

5. The process according to claim 1, wherein the average duration of the data signals determined over several periods serves for subsequent or dynamic calibration.

6. A process for transmitting data between a printing and reading device and a transponder comprising the steps of:

a) transmitting a data signal from a read/write device to a transponder via an electromagnetic or magnetic field;

b) changing the field strength of the electromagnetic or magnetic field during the data transmission while maintaining substantially the same frequency;

c) calibrating a frequency for the field at the beginning of the data transmission by transmitting a signal between said printing and reading device and said transponder wherein the signal has predetermined time intervals; and d) deriving a correction value from the systematic time deviation from a set point that arises from an imprecision of an internal time base used for evaluation so that the correction value calibrates the internal time base at the beginning of the data transmission.

7. The process according to claim 6, wherein the deviation from the setpoint is also determined during data transmission, and the correction value obtained at the beginning is corrected.

8. The process according to claim 1, wherein the frequency used as the time base for evaluating the times between the field strength changes is generated by a free running oscillator, and one or more of the frequency-determining components is changed to calibrate it.

9. The process according to claim 1, wherein the frequency used as the time base for evaluating the times between the field strength changes is generated by a free running oscillator, and the divider ratio of a down-stream frequency divider is altered to calibrate it.

10. The process according to claim 1, wherein the frequency used as the time base for evaluating the times between the field strength changes is generated by a free running oscillator, wherein at least one of the frequency-determining components are changed and the divider ratio of a down-stream frequency divider is altered to calibrate it.

11. A device to transmit data from a read/write device to a transponder comprising:

a free-running oscillator that serves as a time base for the frequency used to evaluate the times between the field strength changes; and a plurality of frequency determining components that are changed to calibrate the time base, wherein a data signal is transmitted by changing the field strength of the electromagnetic or magnetic field while maintaining substantially the same frequency.

12. The device as claimed in claim 11, further comprising a frequency divider coupled to the output of said free running oscillator and having a divider ratio that is used to calibrate the time base.

13. A device for transmitting a data signal from a read write device to a transponder comprising:

a free running oscillator serving as a time base for the frequency used to evaluate the times between field strength changes in the data signal;

at least one frequency-determining component that is changed to calibrate the time base; and a frequency divider coupled to said free running oscillator and having a divider ratio that is used to calibrate the time base, wherein a data signal is transmitted by changing the field strength of the electromagnetic or magnetic field while maintaining substantially the same frequency.

* * * * *